Jan. 12, 1932.  O. KUENZLER  1,840,961

MIXING FAUCET

Filed Feb. 10, 1928

WITNESS
G. V. Rasmussen

INVENTOR
OTTO KUENZLER
BY Bresen Nehreuh
ATTORNEYS

Patented Jan. 12, 1932

1,840,961

UNITED STATES PATENT OFFICE

OTTO KUENZLER, OF FAIRVIEW, NEW JERSEY

MIXING FAUCET

Application filed February 10, 1928. Serial No. 253,276.

My invention relates to valves or cocks for controlling the flow of water and more particularly to water faucets of the type in which hot and cold water are introduced from their respective supply pipes into a common outlet channel. The invention finds specific application in a plumbing fixture ordinarily employed to admix water of two different conditions of temperature to yield, in a single outlet pipe, water of a mean degree of temperature. The invention has for its object to provide a device for admixing the hot and cold water by the shifting of a single operating handle, successively from one position, either "hot" or "cold", to the "warm" position, i. e., indicating a mixture of hot and cold water, without first passing through the position indicating the different conditions of temperature. The more particular object of the invention is to provide a mixing faucet of the nature described which enables one to turn the device into operating position to control the flow of water of one condition of temperature, for instance, cold, directly from its neutral or off position without first passing through the position which will admit of the flow, into the main outlet spout, of water of the other degree of temperature, in the instance, hot water.

Figure 1:
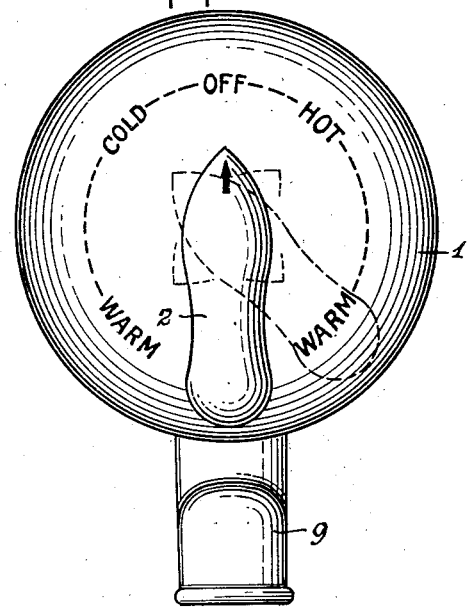
Figure 2:
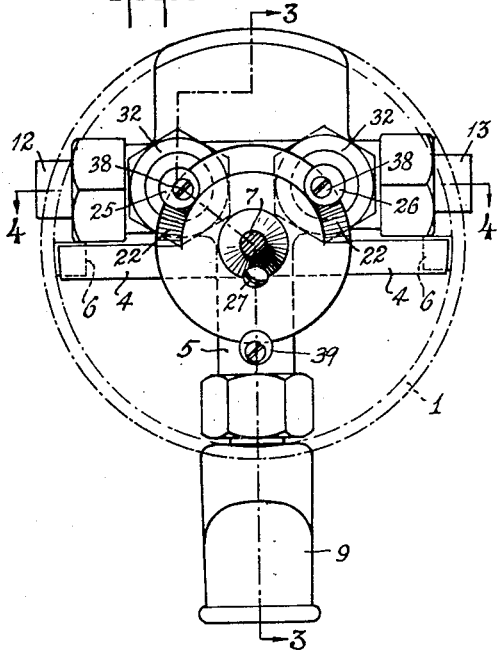
Figure 3:
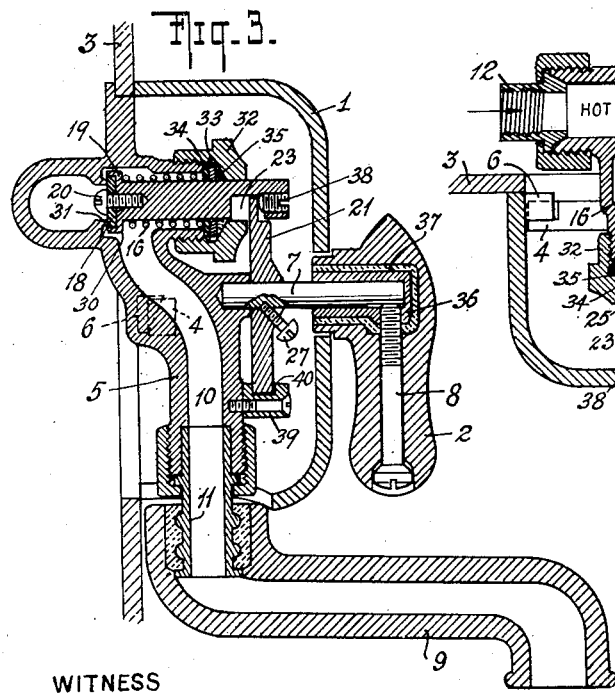
Figure 4:
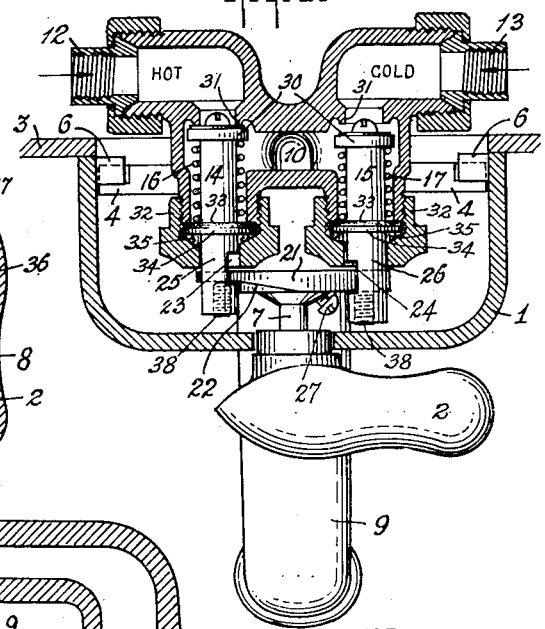

The above objects will be more apparent from an examination of the novel features and combinations thereof which, together with the details of construction hereinafter described, comprise my invention, a specific modification of which is illustrated in the accompanying drawings in which Fig. 1 is an elevation of my improved valve as seen in its assembled form with a porcelain escutcheon covering its essential parts; Fig. 2 is a similar view with the escutcheon removed to reveal the general arrangement of the valve structure; Fig. 3 is a section on the line 3—3 of Fig. 2; and Fig. 4 is a section on line 4—4 of Fig. 2 with the cold water valve in the open position.

Referring now to the drawings and to the reference characters therein, the same numerals indicating similar parts in the several views, 1 designates an escutcheon, usually constructed of porcelain, enveloping the outer portion of the mixing faucet and having thereon the legends indicating the various positions of the operating handle 2. The escutcheon is supported against the sink back 3, on brackets 4 extending from the exterior of the main waterway pipe 5. Lugs 6, 6, on the interior periphery of the escutcheon serve as a means of fastening the latter in its position upon said brackets. When it becomes necessary to remove the escutcheon to gain access to the faucet mechanism covered thereby, the dial handle 2 may be disconnected from the spindle 7 by removing the bolt 8, whereupon a slight rotation of the escutcheon will then disengage it from its supporting brackets 4 and permit of its removal. The spout 9 is coupled to the main pipe 5 of the faucet in such manner that it may be swung to any desired position by means of a housing or sleeve 11 lining the lower portion of the outlet channel 10.

The faucet is provided with the customary inlet channels 12 and 13 for introducing the hot and cold water, respectively, into the main channel 10. These inlet passages are controlled by valves 14, 15, provided with springs 16, 17, each with washer 18, washer cup 19, and screw 20, in the well-known manner. The valves 14, 15 are controlled by a cammed disc 21 so constructed that its thickness for a portion of its periphery, approximately equal to the distance between the central lines of valves 14, 15, is smaller than that of the remaining portion. Furthermore, the peripheral portions of the disc in proximity to that of the decreased thickness are bevelled to present a rising surface 22 adapted to enter into engagement with recesses 23, 24 in the stem pieces 25, 26 of the valves 14, 15. The disc 21 is secured by screw 27 to the spindle 7 carrying the dial handle 2 and is located between the valve stems eccentrically of their line of centers.

The operation of the mixing faucet hereinabove described is as follows:

When the dial handle is in the central or neutral position indicated in Figs. 1 and 3, the valves 14 and 15 are both in their closed position and the disc 21 in the position in which the portion of its periphery of decreased thickness is disposed between the two valve stems 25, 26 and hence having no portion thereof in operative contact with said stems, the depressed surface of the disc not bearing against said stems with any degree of force. If now, it is desired to turn on the faucet to allow, for instance, cold water, to flow from the spout, the handle 2 is turned through an angle toward a position some degrees to the left of the closed or neutral position, i. e., to that indicated by the legend "cold" on the escutcheon 1. The disc 21 being rigidly connected to the dial handle, will turn with it through an equivalent angle forcing one of its bevelled surfaces 22 against the inner surface of the recess 24 forming the upper portion of the recess 24 and imparting to said stem a movement in a direction to cause it to unseat its head 30 from its seat 31 against which it is caused to bear by the spring 17 when the valve 15 is closed. (Fig. 4.) The valve controlling the flow of water from the cold water inlet being gradually opened to its fully opened position as the rising surface 22 forces the stem 26 further from its seat, a further movement of the dial handle 2 in the same direction will cause the same surface 22 to come eventually into the recess 23 and into contact with valve stem 25 forcing the latter from its seat 31 and causing the valve controlling the hot water inlet to be gradually opened, resulting in the flow, through main channel 10 of a mixture of hot and cold water indicated on the escutcheon 1 by the "warm" position of the operating handle. It is, of course, obvious that a reversal of the operation, i. e., the turning of the dial handle in the opposite direction from its original neutral position, toward the legend indicating "hot" would have the effect of allowing a flow of hot water which could, by a further turning of the handle in the same direction, be gradually changed to that of water of the median condition of temperature.

From the above it will be seen that my device makes possible the turning on of water of either condition of temperature, i. e., hot or cold, directly from the neutral or off position without the faucet mechanism passing through a position admitting of the flow of water of the other degree of temperature. In some prior constructions of mixing faucets it is impossible either to directly turn from "hot" to "tepid" without passing through the "cold" position or, to turn from "cold" to "tepid" without first passing through "hot". It has been therefore necessary, in many prior devices, to provide two operating handles in any given apparatus designed to admix water of different degrees of temperature to yield, in a single outlet, water of a mean degree of temperature.

In the specific modification of my invention shown in the accompanying drawings, various refinements are illustrated, which are only preferable structures conducive to the smooth and proper operation of the device and are therefore not essential features of the inventive structure of my mixing faucet. Among these may be mentioned the various packing boxes, housings, and couplings used in conjunction with the known features of the apparatus. Packing boxes 32, 32 for instance, encase the outer portions of the valves 14, 15, metal washers 33 and fibre washers 34 serving, with packing 35, their usual purpose of making a water tight joint. The spindle 7 is surrounded by brass bushing 36, which is, in turn, made fast to handle 2 by a layer of porcelain cement 37.

The extent to which the valves 14, 15 are opened by the turning of the dial handle 2 through a given distance may be regulated by volume regulators comprising screws 38 extending from the outer end of the valve stems 25, 26 (Fig. 3) to the recesses 23, and abutting, within said recesses against the surface of the disc 21. The distance which this screw protrudes from the valve stem into this recess and its resultant abutment against the surface of the disc is a measure of the movement of the valve stem when the bevelled surface of the disc moves in frictional contact with the end of the screw. The movement of this screw within said stem provides, therefore, a means of regulating the volume of water flowing through the valve with a given amount of turning of the dial handle. This volume regulator screw is, in the preferred construction of my device, made of steel to present a frictional wearing surface of a more durable character than the brass of which the remaining portions of the valve may be constructed. It is to be noted also, that in my preferred construction, the screw 38 is introduced into the corresponding valve stem in a position somewhat off-center thereof so that the end of such screw will, in its entirety engage the surface of the disc in frictional engagement. The unequal wearing of the end portion of the screw, greater wear occurring on the side adjacent to said disc, is thus reduced to a minimum.

A guide 39 serves to maintain the disc 21 in its proper position, the recess 40 in said guide serving the function of a raceway within which the disc 21 is confined in its revolution on the shaft 7.

Various changes in the specific form shown and described may be made within the scope of the claims without departing from the spirit of my invention.

I claim:

1. A mixing faucet comprising separate inlet pipes, spring actuated valves controlling said pipes, the stems of said valves being recessed near their ends farthest from the inlets which they control, and a control disc located eccentrically of a line connecting the center lines of the valves, a face of said disc having an outer portion provided with a low plane surface approximately equal in length to the distance between the central lines of said valve stems and a high plane surface and a pair of cam surfaces connecting the high and the low plane surfaces, said outer portion being adapted to operatively engage the recesses in said valve stems to open the valves upon rotation of the disc.

2. A mixing faucet comprising separate inlet pipes, spring actuated valves opening in the direction of flow and controlling the flow through said pipes, discharge conduits communicating with the valves at their seats to lead the flow from the inlet pipes away from the stems of the valves to a common conduit, and a control disc rotatably mounted eccentrically of a line connecting the center lines of the valves, a face of said disc having an outer portion provided with a low plane surface approximately equal in length to the distance between the center lines of said valve stems and a high plane surface and a pair of cam surfaces connecting the high and the low plane surfaces, said outer portion being adapted to operatively engage said valve stems to open the valves upon rotation of the disc.

OTTO KUENZLER.